United States Patent [19]

Shimshi

[11] Patent Number: 5,427,330
[45] Date of Patent: Jun. 27, 1995

[54] SPHEREROLL

[76] Inventor: Ezra Shimshi, P.O. Box 421011, Atlanta, Ga. 30342

[21] Appl. No.: 201,471

[22] Filed: Feb. 24, 1994

[51] Int. Cl.⁶ .............................. B64D 27/02
[52] U.S. Cl. .................................... 244/62
[58] Field of Search ........................ 244/62

[56] References Cited

U.S. PATENT DOCUMENTS

| | | | |
|---|---|---|---|
| 3,683,707 | 2/1972 | Cook | 74/84 |
| 3,968,700 | 6/1976 | Cuff | 74/84 S |
| 4,242,918 | 7/1981 | Srogi | 74/84 S |

FOREIGN PATENT DOCUMENTS

| | | | |
|---|---|---|---|
| 933483 | 4/1948 | France | 74/84 S |
| 225649 | 3/1969 | U.S.S.R. | 74/84 R |

Primary Examiner—Galen L. Barefoot

[57] ABSTRACT

Mechanical structures adapted to produce thrust. Said structures includes components and mass that rotate about two axes of rotation (20, 10) perpendicular to each other and in two-to-one relationship. In operation, the radius of the rotating mass lengthens and shortens so as to cause unequal forces and unequal pressures to develop at predetermined sections in the cycle of rotation. One structure includes two chambers (21) each having a length and a width and each adapted to permit an inflow (45) and outflow (46) of fluid. The other structure includes a shuttle having two sets of mass members (31), one set of mass members in each chamber. During operation the length of the front chamber aligns vertically, while the length of the back chamber aligns horizontally and the set of mass members within each chamber aligns angularly to said length. The unequal pressures and centrifugal forces (42, 43) cause inflow of fluid into the front chamber and outflow of fluid from the back chamber and the unequal centrifugal forces pull the front mass members apart and the back mass members together which propel the shuttle in a linear movement backward (41). In reaction to the flow of fluid and to said linear movement the frame moves forward (44').

4 Claims, 2 Drawing Sheets

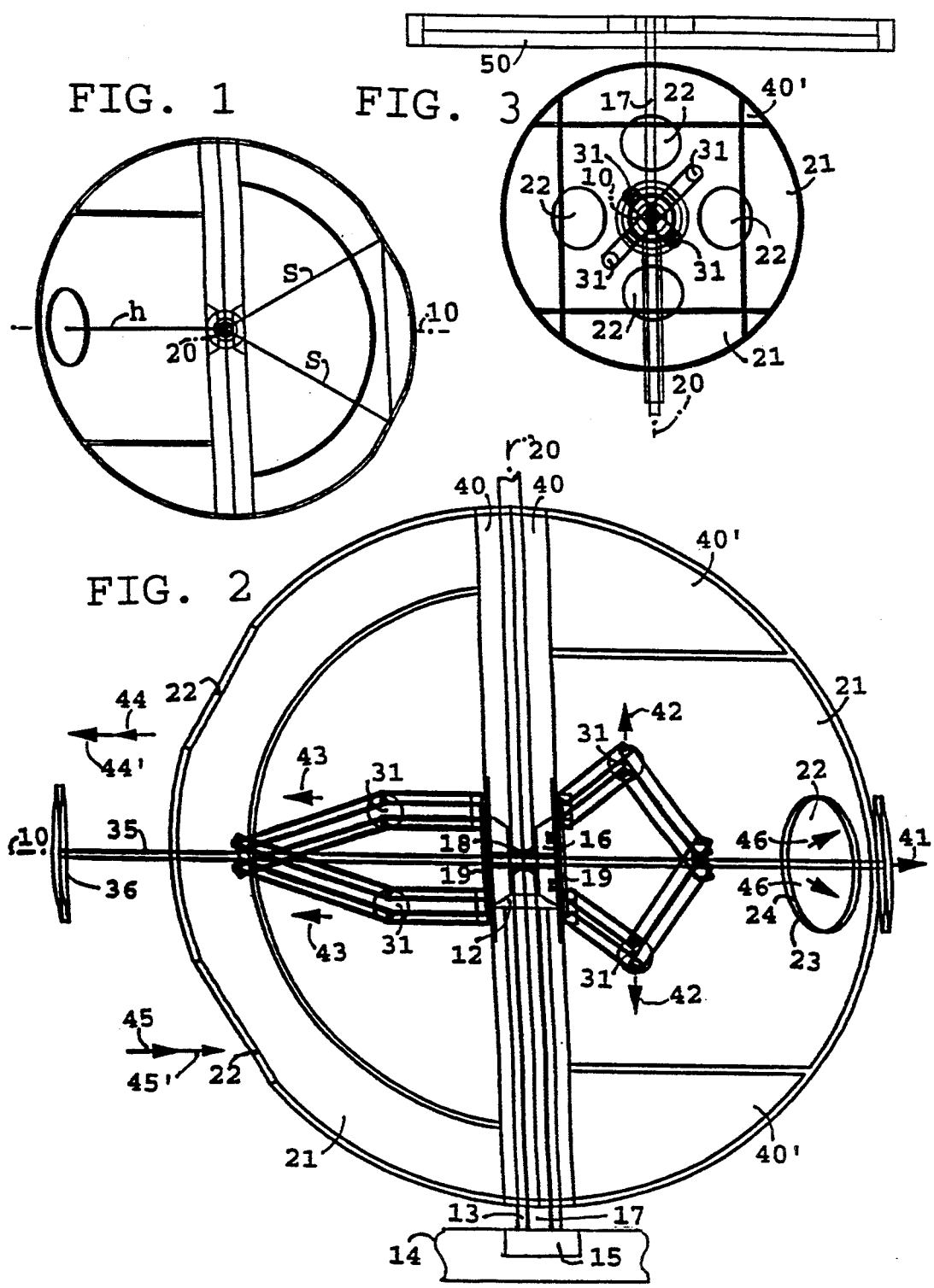

SPHEREROLL

BACKGROUND OF THE INVENTION a) Field of the Invention

This invention relates to a class of devices which utilize a mechanical structure for lengthening and shortening the radius of their rotating components at predetermined moments in the cycle of a revolution.

A unique geometrical configuration has been introduced in this invention that can be utilized for different purposes. Subjecting mass to centrifugal forces and to unequal pressures to achieve a multi-task machine that conserves energy is one of the aims of this invention.

b) The Prior Art

The prior Art has provided complex machines which fail to deliver on the promises of intended use primarily because of at list one violation of the laws of physics upon which their operation was predicated.

The most pertinent prior art known to the Applicant at the time of filing this application is embodied in the following U.S. Pat. No. 4,242,918 Issued: Jan. 6, 1981 Inventor: Ladislaw G. Srogi; U.S. Pat. No. 3,968,700 Issued: Jul. 13, 1976 Inventor: Calvin I. Cuff; U.S. Pat. No. 3,683,707 Issued: Aug. 15, 1972 Inventor: Robert L. Cook.

SUMMARY OF THE INVENTION

The objects of the present invention are to provide a multi-purpose machine that reduces the consumption of energy needed to operate any rotating object which is utilized to perform a function; to introduce a vehicle for its adaptability to the crowded inner-cities; and to offer means for reducing pollution.

These and other objects of this invention are attained by harnessing the influence of centrifugal forces on rotating mass and the effect that pressure differential has on fluid when the rotating objects of the present machine are confined to the equal sides and the height of an isosceles triangle and are being rotated on its vertex about two axes of rotation in two-to-one relationship.

BRIEF DESCRIPTION OF THE DRAWINGS

In the accompanying drawings forming part of this specification, and in which like reference characters are employed to designate like parts throughout the same:

FIG. 1 is a top plan view, without the shuttle, for illustrating the invention basic concept;

FIG. 2 is a side view with the shuttle in a random resting position not in correlation with its position during operation; during operation the shuttle will appear in the center and the two saucers will be at the same distance from the Sphereroll.

FIG. 3 is a front view with the mass members in a random position when the Sphereroll is not in operation; the vertical holes are at the front and the horizontal holes are in the back; a wheel has been added as a possible form of the device;

DESCRIPTION OF THE INVENTION

Figure 4:
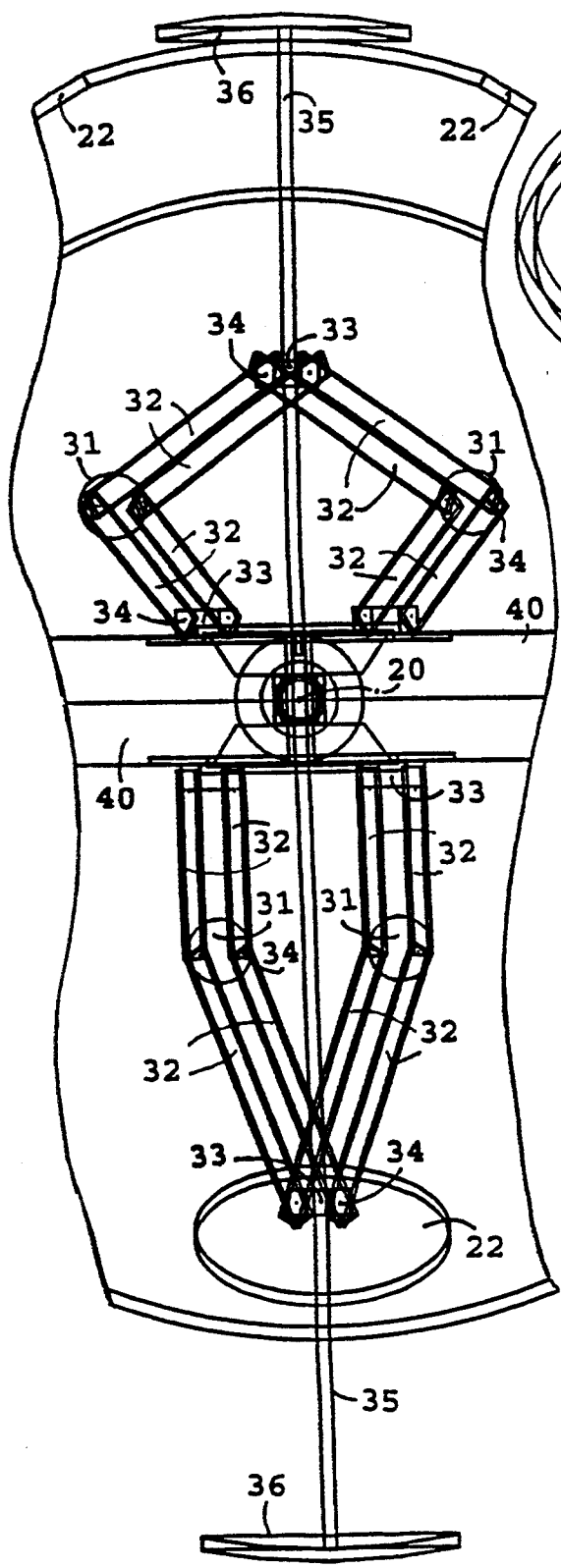
FIG. 4 is a top plan view with the shuttle depicted specifically in its static position settling in its own weight.

The Sphereroll is an invention that contains two independent devices which have been designed to operate individually or jointly. These devices are capable of utilizing their own rotary motions so as to present a multi-purpose machine. Although the Sphereroll requires an initial outside drive for its operation, it reciprocates by supporting that initial drive in different ways.

The basic principle on which the Sphereroll is being utilized encompasses a mechanical structure which lengthens and shortens the radius ("s", "h") of the rotating components at predetermined sectors in the cycle of rotation; which structure produces highest and lowest radial velocities in two predetermined opposite sectors in the path of the rotating components; which structure develops unequal pressures at opposite ends of the rotating components; and which structure produces net force in one direction. This principle, illustrated in FIG. 1, is a geometric phenomenon involving an isosceles triangle designed to revolve about two distinct axes of rotation and which offers its equal sides "s" as a radius of rotation in one section in the cycle of rotation, while in the opposite section it offers its height "h" as a radius of rotation for the same rotating objects.

The following is a list of numbers and the parts they represent in the drawings:

| | |
|---|---|
| 10 | Secondary axis |
| 12 | Stationary gear |
| 13 | Sleeve |
| 14 | Frame |
| 15 | Motor |
| 16 | Drive gear |
| 17 | Shaft |
| 18 | Drive bearing |
| 19 | Axle |
| 20 | Primary axis |
| 21 | Chamber |
| 22 | Channels |
| 23 | Cylinder |
| 24 | Rim |
| 31 | Mass member |
| 32 | Bracket |
| 33 | Hinge |
| 34 | Pin |
| 35 | Rod |
| 36 | Saucer |
| 40 | Strip |
| 40' | Hemisphere |
| 41 | Linear movement |
| 42 | Centrifugal forces |
| 43 | Centrifugal force |
| 44 | Reciprocal motion |
| 44' | Direction of travel |
| 45 | Mass resistance |
| 45' | Vacuum |
| 46 | Jet thrust |
| 49 | Twin bevel-gear |
| 50 | Wheel |

The Sphereroll as depicted in FIG. 2 is shown in its simplest form, wherein a stationary gear 12 and a sleeve 13 are bounded together to a frame 14. A motor 15, which is attached to the frame, propels a drive gear 16 through its shaft 17 which is placed in the center of the sleeve. The shaft is fixed to a drive-bearing 18, shown in FIG. 5, which turns an axle 19 that rolls in it and on which axle the drive gear rides together with its twin bevel-gear 49, which twin bevel-gear rolls freely in the opposite direction and is utilized here for stability and balance. The drive gear is meshed with the stationary gear and rolls around it about a primary axis 20 while rotating around a secondary axis 10, at the same time. Two chambers 21 and a shuttle, referred to more specifically in FIG. 4, are attached to drive gear 16 through axle 19 and rotate with them about the primary axis and the secondary axis.

The two chambers are positioned on both sides of the primary axis with their bottoms parallel to each other but with the bottoms' longitudes perpendicular to each other. A pair of channels 22, made of cylinders 23, in each chamber, with a rim 24 meshing with the chamber's top skin and the Sphereroll skin, are placed along the longitudes, so that when one pair is aligned parallel to the primary axis at one sector in the path of rotation the other pair is aligned perpendicularly to the primary axis in the opposite sector. In this positions the rims of the perpendicularly aligned channels, or cylinders, reach higher angular velocity than the rims of the parallel aligned channels. The unequal velocities produce unequal pressures between the front and the back channels along the cylinders. The chambers are enveloped by two hemispheres 40', illustrated in FIG. 6, with channels 22 open through their skins.

Figure 6:
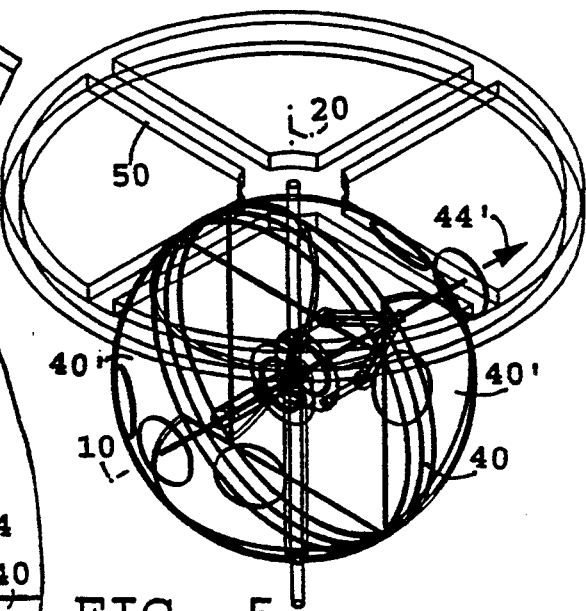
FIG. 6 is a 3-D view of the Sphereroll with a wheel mounted.
Figure 5:
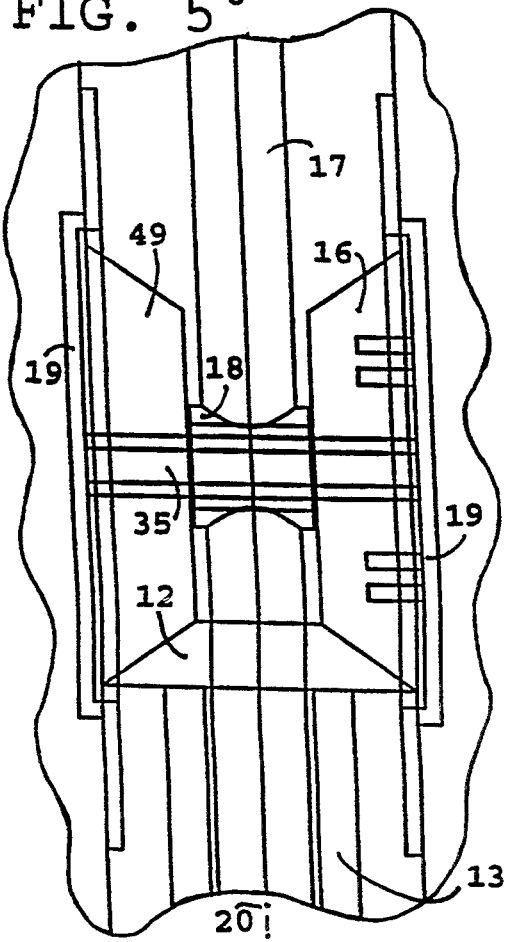
FIG. 5 is a side view without the shuttle; an axle is depicted bounded to the drive gear; a twin bevel-gear rolls freely and is being used for stability and balance in this form of the device.

The shuttle assembly includes two sets of mass members 31, one set of two mass members in each chamber 21; two carriage units, referred to in FIG. 4 include brackets 32, hinges 33 and pins 34; a rod 35 which is capable of sliding through the center of axle 19 and through the tops and bottoms of chambers 21; and two saucers 36 mounted on the ends of the rod at the outskirts of the Sphereroll, illustrated in FIG. 6. The carriage units are attached to axle 19 and to rod 35, in both chambers 21, enabling the shuttle to move in a linear movement 41 and permitting mass members 31 to swing under the influence of centrifugal forces 42 and 43, upon rotation. the shuttle assembly is positioned angularly with relation to the position position of the chambers, whereby the straight lines connecting the two mass members in each set are in 45 degrees orientation to primary axis 20, illustrated in FIG. 3. The planes of motion of the two sets of mass members are perpendicular to each other, FIG. 3, whereby one set aligns its two mass members perpendicularly to the primary axis at a predetermined sector in the path of rotation, which upon rotation are under centrifugal forces 42, tending to spread them apart, while the other set aligns its mass members in parallel to the primary axis in the opposite sector and therefore are under centrifugal force 43, tending to pull them together. FIGS. 2, 3, 4 and 6 illustrate the shuttle with the mass members in a position 45 degrees earlier in the cycle than the channels around the primary axis. As the Sphereroll rolls, the mass members move in a pendulum motion with relation to the primary axis which cause the shuttle to oscillate in relation to the inner sphere, but move, generally, in one direction 41 in relation with the frame. The saucers are also appear to move in one direction 41 against, or with, the flow of fluid in front and at the back of the sphereroll, whereby assuming the roll of an anchor to the shuttle by hindering the shuttle linear movement 41 and therefore producing a reciprocal motion 44 in reaction to a shuttle linear movement 41. The saucer in front is being pushed back by the relative wind or stream and thus supports the movements of the mass members.

The unequal velocities and the unequal pressures that can be developed at two predetermined opposite sectors in the path of rotation may be utilized separately or jointly with the reciprocal motion produced by the shuttle, which reciprocal motion may be utilized also separately.

One of the tasks that Sphereroll can accomplish in operation is in supporting its surrogate mother vehicle, or boat. By placing a Sphereroll in front of a vehicle, or a boat, the higher pressure at the front chamber scoops mass 45 that resists forward movement 44, 44' and swings its high density mass to the back where the dense mass exit through the low pressure channels as jets thrust 46 which is under the influence of centrifugal forces 42 acting on the mass in the direction of jets 46. A centrifugal force 43 is acting in the direction of travel 44' on the dense mass content of the front chamber as it swings to the back. A unidirectional thrust of forces have, therefore, been developed which combines the displacement of the resisting mass by the front chamber that forms a vacuum into which the Sphereroll moves, the forward centrifugal force 43, the jets thrust 46 and the reciprocal motion 44 that has been produced in reaction to the shuttle linear movement 41.

A pair of Sphererolls may be mounted on one frame and rotate in opposing directions for balance. The Sphereroll can reduce friction with the surrounding mass to the minimum, which is inherent in rotating spheres. Two strips 40 cover the gap between hemispheres 40' to form a sphere 40—40' with four holes. The strips are made of flexible material so as to permit sleeve 13 to protrude and slide between them.

Another form in which the Sphereroll supports its surrogate mother is by placing it within a revolving component, for example, a wheel 50, whereby the Sphereroll and an automobile wheel are driven by the same shaft 17. The wheel traction with the road together with motor 15 can move the automobile, or frame 14, and start the Sphereroll rotation. The wheel and the Sphereroll, therefore, are operating in support of each other which reduces the energy needed to run the automobile and which makes this future means of travel more fit for mass production than any other known vehicle today. Its simplicity, adaptability, low-cost and clean operation will make it an effective and safe means of transportation in the hands of the general public.

While this invention has been described with reference to the structure disclosed herein, it is not confined to the details as set forth and is not intended in any way to limit the broad features or principles of the machine, or the scope of patent monopoly to be granted. This application is intended to cover any modification or changes that may come within the scope of the following claims.

I claim:

1. Apparatus for producing thrust that cause a reciprocal motion in reaction to said thrust at a predetermined direction, comprising:
   a. a frame,
   b. rotatable mass adapted to spread apart and to pull together at predetermined opposite sectors in the path of rotation under the influence of changing radial velocities and centrifugal forces based on a principle involving an isosceles triangle having equal sides and a height adapted to rotate on its vertex about a primary axis and secondary axis in two-to-one ratio of rotation, said primary axis and secondary axis perpendicular to each other,
   c. means for confining said rotatable mass into shapes having lengths and widths, the confining means include means for producing thrust, said means for producing thrust include closed surfaces, d. means for synchronizing the rotations of said confining means so as to confine said rotatable mass along said equal sides and said height of said isosceles triangle at predetermined sectors in the path of rotation, to cause fluid to press against said closed surfaces at predetermined sectors in the path of rotation and to cause a reciprocal motion in reaction to the flow of fluid, e. means for locking the synchronizing means to said frame, f. means for attaching said rotatable mass to said confining means g. means for anchoring said confining means to said synchronizing means, h. drive means for activating said synchronizing means.

2. The apparatus of claim 1, wherein said confining means include a chamber on each side of said primary axis having a cross section with lengths perpendicular to each other and channels at predetermined locations along said lengths adapted to allow an inflow of fluid to the front chamber and an outflow of fluid from the back chamber so as to produce the thrust that causes said reciprocal motion at a predetermined direction, a shuttle having a set of mass members in each of said chambers, a rod adapted to slide along said secondary axis, saucers attached to said rod adapted to act as an anchor to inhibit said shuttle linear movement that causes the thrust and said reciprocal motion in reaction to said linear movement, and carriage means for propelling said shuttle in said linear movement along said secondary axis under the influence of centrifugal forces, said carriage means in each of said chambers connected to said synchronizing means and to said rod so as to be able to swing between said synchronizing means and said rod during operation, said synchronizing means include a drive gear and a stationary gear adapted to mesh with each other, said drive gear adapted to rotate around said stationary gear and about said primary axis and said secondary axis, to accelerate and to decelerate said confining means and rotatable mass at predetermined points in the path of rotation, said confining means and said rotatable mass adapted to develop unequal pressures at predetermined opposite ends in said path of rotation, to transfer rotational energy into linear energy, to convert rotary motion into linear movement and linear movement into rotary motion, to produce reciprocal motion in reaction to said linear movement, to reduce mass resistance to said reciprocal motion, to redirect reactive forces into unidirectional net force and to cause an inflow of fluid into the front chamber and an outflow of fluid from the back chamber, said set of mass members in each of said chambers adapted to utilize said carriage means so as to produce pendulum motions in relation to said primary axis under the influence of centrifugal forces that oscillate said shuttle along said secondary axis, said pendulum motions of each of said sets of mass members having a plane of movement perpendicular to each other and the connecting straight line of said mass members in each chamber is in 45 degree angular orientation to the length of said chamber so as to achieve a dynamical balance and coordinated production of said thrust.

3. The apparatus of claim 2, wherein said synchronizing means further include a twin bevel-gear adapted to stabilize said synchronizing means and to counterbalance said drive gear, an axle adapted to turn said drive gear, a drive bearing adapted to spin said axle, a shaft adapted to propel said drive bearing, a sleeve adapted to lock said stationary gear to said frame at a predetermined orientation.

4. The apparatus of claim 1, further comprising:

a. hemispheres adapted to envelope said confining means so as to reduce friction with the surrounding fluid, said hemispheres having openings through their skin at predetermined locations adapted to permit a free flow of said fluid, said hemispheres form a sphere, said sphere having front and back so that said openings are exposed equally between said front and said back at all times, said hemispheres adapted to permit dual rotation about said primary axis and said secondary axis, b. means for supporting said drive means.

* * * * *